United States Patent
Brodeur (10) Patent No.: US 7,905,746 B2
(45) Date of Patent: Mar. 15, 2011

(54) ADJUSTABLE CONNECTOR FOR ELECTRICAL CABLE

(75) Inventor: Marc Brodeur, St Jean sur Richelieu (CA)

(73) Assignee: Thomas & Betts International, Inc., Wilmington, DE (US)

( * ) Notice: Subject to any disclaimer, the term of this patent is extended or adjusted under 35 U.S.C. 154(b) by 215 days.

(21) Appl. No.: 12/378,142

(22) Filed: Feb. 11, 2009

(65) Prior Publication Data

US 2009/0258509 A1    Oct. 15, 2009

(51) Int. Cl.
*H01R 13/56* (2006.01)

(52) U.S. Cl. ........... 439/446; 439/10; 285/184; 285/181; 285/272

(58) Field of Classification Search .................. 439/446, 439/6, 10, 11, 583, 584, 581; 285/184, 181, 285/272; 174/651, 656
See application file for complete search history.

(56) References Cited

U.S. PATENT DOCUMENTS

| | | | |
|---|---|---|---|
| 954,504 A | 4/1910 | Drew | |
| 1,125,642 A | 1/1915 | Blanchard | |
| 1,285,849 A | 11/1918 | Walling | |
| 1,880,098 A | 9/1932 | Mair | |
| 2,447,947 A | 8/1948 | Larson | 285/122 |
| 2,479,580 A | 8/1949 | Marco | |
| 2,557,507 A | 6/1951 | Lang, Jr. | |
| 2,581,047 A | 1/1952 | Salmond et al. | |
| 2,791,451 A | 5/1957 | Rostan | |
| 327,877 A | 10/1985 | Hodges | |
| 4,807,370 A | 2/1989 | Trimble | |
| 5,064,226 A | 11/1991 | Klas | 285/184 |
| 5,165,734 A | 11/1992 | Smith | 285/276 |
| 5,507,535 A | 4/1996 | McKamey | 285/168 |
| 5,816,624 A | 10/1998 | Smith | 285/276 |
| 5,887,908 A | 3/1999 | White | |
| 6,034,325 A | 3/2000 | Nattel | 174/59 |
| 6,114,631 A | 9/2000 | Gretz | 174/65 |
| 6,262,369 B1 | 7/2001 | Marik et al. | 174/64 |
| 6,380,483 B1 | 4/2002 | Blake | 174/65 R |
| 6,561,549 B1 | 5/2003 | Moris et al. | |
| 6,581,974 B1 | 6/2003 | Ragner et al. | |
| 6,768,057 B2 | 7/2004 | Blake | 174/65 R |
| 6,932,390 B1 | 8/2005 | Gretz | |
| 6,957,832 B1 | 10/2005 | Pannekoek | |
| 7,394,021 B2 * | 7/2008 | Magno, Jr. | 174/59 |
| D586,006 S | 2/2009 | Pannekoek | |
| 2007/0246258 A1 | 10/2007 | Magno | 174/651 |

* cited by examiner

*Primary Examiner* — Xuong M Chung Trans
(74) *Attorney, Agent, or Firm* — Hoffmann & Baron, LLP (57) ABSTRACT

An adjustable connector for armored that includes a body, a hub, a clamp and a coupling nut. The body has a flanged end that is angularly disposed to the longitudinal axis and the hub has a mating flange that is angularly disposed to the central axis. The mating flange has a dovetail for receiving the flanged end and joining the body and hub together. The clamp is placed over the flanged end and mating flange and secured in place by tightening the coupling nut on the hub.

24 Claims, 8 Drawing Sheets

ADJUSTABLE CONNECTOR FOR ELECTRICAL CABLE

This application claims priority from patent U.S. application Ser. No. 12/082,902, filed on Apr. 15, 2008 and provisional application Ser. No. 60/925,395, filed on Apr. 20, 2007, which are incorporated herein in their entirety.

FIELD OF THE INVENTION

The present invention relates to fittings for electrical cables. In particular, the present invention relates to adjustable connectors that are used to change the direction of electrical cables.

BACKGROUND OF INVENTION

Armored electrical cables can be used in a wide variety of applications. They are particularly suited for applications that require the wiring to be isolated from the surrounding environment. The construction of the cables permits them to be used in environments which are referred to as hazardous locations, as well as in non-hazardous locations. Traditionally, wiring runs in hazardous locations use rigid metal conduit. However, when permitted by the applicable electrical codes, flexible armored cable may be used in place of rigid conduit. In general, rigid conduit is more difficult and more expensive to install than armored cable. Therefore, users prefer to use armored cable whenever the electrical codes permit.

Armored cable, typically, includes an electrically conductive flexible metal casing which protects the conductors running within from abrasion, impacts and the like. In addition, the metal casing permits the cable to be grounded throughout its length. An outer plastic or rubber sheath typically covers the metal casing thereby adding water proof protection to the cable, as well as protecting the metal sheathing from corrosive elements. Although armored cable is more flexible and easier to install than rigid conduit, its bend radius can make it difficult to form tight bends and, hence, installation in certain locations requires elbows or other fittings.

In the past, a 90-degree bend in an armored, electrical cable was accomplished using either an assembly of different approved fittings (e.g., a pull elbow connected to a straight fitting) or a short single 90 degree fitting. Similarly, fittings for other bend angles were used and, as a consequence, a user was required to stock fittings for a variety of different angles. This was found to be expensive and inconvenient.

Accordingly, there is a need for a fitting for changing the direction of an armored, electrical cable, as well as other types of electrical cables, that can be quickly and easily installed. There is a further need for an adjustable connector for armored and other types of electrical cables that can make bends in an armored, electrical cable over a range of at least from 0-90 degrees.

SUMMARY OF THE INVENTION

In accordance with the present invention, an adjustable connector for armored and other types of electrical cables is provided. The adjustable connector includes a body, a hub, a clamp and a coupling nut. The body has a longitudinal axis, a flanged end, a cable connecting end and an aperture extending between the two ends. The flanged end has a face that is angularly disposed to the longitudinal axis, preferably at an angle of from about 30 to about 60 degrees, and most preferably at an angle of about 45 degrees. The cable connecting end can be threaded for connecting to a fitting or an enclosure.

The hub includes a cylindrical portion and a mating flange. The cylindrical portion has a central axis, an exterior surface, first and second ends and an opening extending between the ends. The mating flange is connected to the first end and extends radially from the opening to an outer perimeter that is angularly disposed to the central axis, preferably at an angle of from about 30 to about 60 degrees, and most preferably at an angle of about 45 degrees. The mating flange has a dovetail extending in an arc of approximately 45 degrees (but it could be more or less) around the outer perimeter and the exterior surface adjacent the second end has a plurality of threads. The mating flange can also have a raised edge along all or a portion of the outer perimeter and a mating surface between the opening in the cylindrical portion and the raised edge. The mating surface contacts the flanged end of the body when the connector is assembled so that the central axis of the hub can be disposed with respect to the longitudinal axis of the body at an angle of from about 0 to about 90 degrees. The threaded second end of the hub can be adapted to receive a cable or for connecting the hub to an enclosure. Preferably, the hub includes one or more wedged abutments, preferably two, on the exterior surface of the cylindrical portion adjacent to the mating flange. The wedged abutments are preferably located at opposing points on the cylindrical portion and are adapted to engage the clamp when the clamp is installed on the hub. The hub can also include a circumferential groove between the first and second ends, which is adapted to receive an elastic O-ring. When the O-ring is installed in the circumferential groove, it restricts the movement of the coupling nut.

The clamp includes a base wall, a pair of side walls, a retainer and a pair of tabs. The base wall has a top, an interior side and opposing ends and the pair of side walls extend from the interior side of the opposing ends to a pair of distal ends. The side walls have a top that corresponds to the top of the base wall. The base wall and the pair of side walls define an interior. The retainer is connected to the top of the base wall and preferably extends upwardly from the top of the base wall to a lip. The lip extends towards the interior of the clamp and has a recessed portion that is adapted to receive the flanged end of the body. A tab extends from the top of the distal end of each side wall. The tabs can be wedge-shaped and can slope downwardly from the base of the tab to the end. Preferably, the base and the pair of side walls are arcuately shaped and correspond to the cylindrical portion of the hub. This allows the clamp to be fitted over the hub like a saddle.

The coupling nut has first and second ends with an axial bore extending therebetween and a perimetrical edge extending around the perimeter of the axial bore at the first end. The first end adjacent the perimetrical edge can have a plurality of notches, which are adapted to engage the clamp when the coupling nut is threaded onto the second end of the hub.

When the adjustable connector is assembled, the dovetail is adapted to receive the flanged end and the clamp is adapted to secure the flanged end to the mating flange. The coupling nut is then installed on the threaded second end to secure the clamp in place. After the connector is assembled and the body is connected to the hub, the longitudinal axis of the body can be oriented so that it is substantially parallel to the central axis of the hub or the body and hub can be rotated so that the longitudinal axis is disposed with respect to the central axis at an angle of up to about 90 degrees.

The flanged end can have indicia of the angular disposition of the adjustable connector. The indicia allow the user to easily determine the orientation of the body with respect to the hub.

BRIEF DESCRIPTION OF THE FIGURES

The preferred embodiments of the adjustable cable fitting of the present invention, as well as other objects, features and advantages of this invention, will be apparent from the accompanying drawings wherein.

DETAILED DESCRIPTION OF THE INVENTION

The present invention is an adjustable connector (also referred to herein as an "adjustable fitting" or "connector") that is used with armored and other types of electrical cables to make bends in a cable run. In general, armored cables are metal clad and contain one or more individually insulated conductors. Preferably, the armored, electrical cable is a flexible, interlocked aluminum armored cable having an inner PVC jacket over the insulated conductors as well as outer PVC jacket over the armor. Such cables are referred to herein as "teck cables." However, the invention is not limited to use with teck or other types of armored cables and can be used with any electrical cable. As used herein, the term "armored electrical cable" means a metal (e.g., steel, aluminum or brass) or non-metal (e.g., plastic) conduit or cable having a flexible, corrugated construction with or without interlocking helix, whether jacketed or unjacketed or lined or unlined (e.g., with a PVC jacket or liner).

The present invention relates to adjustable fittings or connectors that are used for bends in electrical cables. The connectors have two or more components that have apertures (also referred to as axial bores), which extend substantially straight through the components. This allows the cables to be easily inserted directly into each of the straight apertures in each of the components of the fitting without having to bend the cable to conform to the shape of the fitting, which is typically the case with elbow fittings. This eliminates the time consuming and often difficult task of pre-bending the cable and forcing the wire bundle through a 90 degree elbow.

Traditional rigid 45 or 90-degree fittings need to be disassembled into separate components before a prepared cable is inserted and then re-assembled when the cable is in place. As used with regard to armored cables, the term "prepared cable" means an armored cable with the outer protective coating and/or the armored portion removed so that the cable is compatible with the connector. The connectors of the present invention can be disassembled into separate components and the cable inserted through the separate components or the connectors can remain assembled during cable insertion. Prior to running the cable, the adjustable connectors can be rotated into a variety of configurations to facilitate insertion of the cable by the user.

In a preferred configuration, the axes of the two or more components that make up the connector are aligned and form an aperture that goes substantially straight through the connector without any bends. This "straight-through" configuration facilitates the insertion of the cable. After the cable is run and bends need to be made, the connector components (i.e., the body and the hub) can be rotated (or swiveled) to form the desired angle and then locked into position using a clamp and coupling nut. The angle formed by the connector can be varied from 0 to 90 degrees before the connector is locked in a fixed position or orientation. In some applications, the user may find it more convenient to adjust the connector to a specific angle before inserting the cable. In other applications, the user may choose not to completely tighten the coupling nut so that the cable and the components of the connector are not locked into a fixed orientation and are free to rotate.

When a bend in an electrical cable is made, the bending of the conductors occurs only at a point inside the fitting. This is a significant improvement over the prior art elbows, wherein the entire cable run needed to be pre-bent and forced through the bending angle of the elbow. The straight-through configuration of the components of the adjustable fitting of the present invention provides openings in the body and hub that are aligned and concentric. The angularly disposed flanged end of the body and the angularly disposed mating flange of the hub each have elliptically shaped openings with a major axis (i.e., the maximum distance between the opposing sides of the opening) and a minor axis (i.e., the minimum distance between the opposing sides of the opening). When the body and hub are rotated to form different angles for the connector, the minimum opening in the connector is at least equal to the minor axis of the body or hub (whichever is smaller).

The adjustable connector includes a body and a hub rotatably coupled together so that each member can be rotated relative to the other between a first position, wherein the body and hub extend in longitudinal alignment to provide a straight connection (i.e., 0 degrees or 180 degrees), and a second position, wherein the longitudinal axes of the body and hub extend at a 90 degree angle with respect to the other axis to provide a 90 degree connection. A clamp is installed over the flanged end of the body and the mating flange of the hub to fix the position of the body relative to the hub. The body and the hub can also be connected at any angle between the first and second positions by rotating the body and hub to a desired orientation and then tightening the coupling nut against the clamp to lock the body and the hub in a fixed position.

The body section of the adjustable connector has a longitudinal axis and includes a flanged end, a cable connecting end and an aperture extending between the two ends. Preferably, the opening in the flanged end is larger than the opening in the connecting end to facilitate connection to the mating flange on the hub, as described in more detail below. The flanged end has a substantially flat face that extends around the opening in the body and is angularly disposed to the longitudinal axis of the body. Preferably, the face of the flanged end is disposed at an angle of from about 30 to about 60 degrees, and most preferably at an angle of about 45 degrees. The cable connecting end can be threaded for connecting the body to a fitting or an enclosure or it can have a plain end that is connected using a compression fitting.

The hub includes a cylindrical portion with a mating flange on one end and a connection end for connecting the hub to an armored electrical cable. The cylindrical portion has a central axis, an exterior surface and an opening (i.e., an aperture or an axial bore) extending between the two ends. The mating flange is connected to the first end of the hub and extends radially from the opening to an outer perimeter. Preferably, the mating flange has a raised edge on the outer perimeter and a mating surface between the opening in the cylindrical portion and the raised edge. When the flanged end of the body is received by the mating flange, the flanged end is received within the raised edge of the mating flange and the surface of the flanged end contacts the mating surface. The connection end of the hub has a plurality of threads on the exterior surface for receiving the threads of the coupling nut. In a preferred embodiment, the cylindrical portion of the hub includes a circumferential groove between the first and second ends that is adapted to receive an elastic O-ring. After the coupling nut is threaded onto the hub and passes over the circumferential groove, the elastic O-ring is installed in the groove to prevent the coupling nut from being loosened to a point where the mating flange and the flanged end of the body can be disconnected. The elastic O-ring is of the type typically used in electrical fittings and can be made from a rubber material or a synthetic material with elastic properties similar to rubber.

The mating flange is angularly disposed to the central axis of the hub at an angle of from about 30 to about 60 degrees, and preferably about 45 degrees. Because of the angular disposition of the mating flange, one portion of the mating flange is located a minimum distance from the connection end of the hub and an opposing portion is located a maximum distance from the connection end. For the purposes of the present disclosure, the portion of the mating flange located the minimum distance from the connection end is referred to as the "top" of the hub and the portion of the mating flange located the maximum distance from the connection end is referred to as the "bottom" of the hub. The mating flange has a dovetail extending in an arc of at least about 45 degrees around the outer perimeter. The dovetail is designed to receive at least a portion of the perimetrical edge of the flanged end of the body in a tongue and groove relationship. In some embodiments, the dovetail can extend up to about half the distance around the outer perimeter of the mating flange.

The threaded second end of the hub can be connected by a fitting to an armored electrical cable or it can be connected to an enclosure. Preferably the hub includes a pair of wedged abutments on the exterior surface of the cylindrical portion adjacent to the mating flange. The wedged abutments are located at opposing points on the cylindrical portion of the hub and, preferably, are wedge-shaped protrusions on the exterior surface. Each of the wedged abutments has a top wall that corresponds to the top of the hub and a bottom wall that corresponds to the bottom of the hub. The side walls are substantially perpendicular to the exterior surface of the hub so that they form a ledge. As the wedged abutments extend from a point adjacent to the mating flange towards the connection end of the nub, at least the bottom walls slope upwardly to provide the wedge shape. In a preferred embodiment, the bottom walls of the wedged abutments have a "stepped" construction so that, instead of sloping upwardly with a continuous flat surface, they slope upwardly in a plurality of steps. As described in more detail below, the wedged abutments are adapted to engage the tabs on the clamp.

The clamp has a base wall with a pair of side walls extending from the opposing ends. Preferably, the base wall and side walls are curved so that they continuously contact the curved exterior surface of the cylindrical portion of the hub in a manner similar to a saddle. The base wall and side walls each have a pair of opposing ends, as well as corresponding tops, bottoms, interior sides and exterior sides. The side walls extend substantially orthogonally or at an angle greater than 90 degrees from the interior side of the opposing ends of the base wall to distal ends and define the interior of the clamp. A retainer extends upwardly form the top of the base wall to a lip that extends towards the interior. The lip has a recessed portion on the bottom portion that is adapted to receive and engage the flanged end of the body when the body and hub are connected.

A tab having a base and an end extends from the top of the distal end of each of the side walls. The tabs can be substantially rectangular but are preferably wedge-shaped with the interior side (i.e., the side facing the base wall) sloping away from the base wall as the tab extends towards the end, while the opposing side of the tab extends substantially perpendicularly from the top of the side wall. After the flanged end of the body is joined with the mating flange of the hub, the clamp is installed on the top of the hub so that the lip of the retainer overlaps the mating flange and the flanged end of the body on the top and the tabs slide under and engage the wedged abutments on the bottom. In another embodiment, the hub does not have wedged abutments and the tabs of the clamp engage the back side of the mating flange when the coupling nut is tightened against the clamp.

The distance between the base wall and the tabs is selected so that, when the clamp is installed on the hub, the retainer overlaps the flanged end of the body that is joined with the mating flange and the tabs snugly contact the ends of the wedged abutments closest to the connection end of the hub. In this configuration, the bottom walls of the wedged abutments slope upwardly from the mating flange in the direction of the top of the hub and the interior sides of the tabs slope downwardly in the direction of the bottom of the hub. As the coupling nut is tightened to apply force on the clamp in a direction from the connection end towards the mating flange end of the hub, the clamp simultaneously moves closer to the mating flange and in a downward direction (i.e., in a direction from the top of the hub towards the bottom) due to the corresponding sloped constructions of the wedged abutments and tabs. This forces the retainer down onto the flanged end/mating flange connection and frictionally engages the wedged abutments and tabs to secure the body to the hub in a fixed position.

The coupling nut has first and second ends with an axial bore and an interior surface extending between the two ends. The interior surface is threaded and the first end of the nut is adapted to be received by the threaded connection end of the hub. The coupling nut also has a perimetrical edge on the first end that extends around the perimeter of the axial bore. The first end adjacent to the perimetrical edge preferably has a rough surface or a plurality of notches, which are adapted to engage the clamp when the coupling nut is threaded onto the second end of the hub.

After the flanged end of the body is joined to the mating flange on the hub, the coupling nut is tightened to secure the body and hub in any desired angular relationship. In the tightened position, the coupling nut snugly fits against the clamp to lock the body and hub together in the desired orientation. This is referred to herein as the "tightened position" or "locked position." When the coupling nut is loosened slightly, the pressure on the clamp is decreased so that the body and hub sections of the connector can be swiveled to any angular orientation relative to one another. This is referred to herein as the "adjustable position." The slidable faces of the flanged end and mating flange allow a continuous 360-degree rotation until the coupling nut is retightened against the clamp to lock the body and hub together in a selected angular orientation. When the connector is in the adjustable position, further loosening of the coupling nut allows the clamp to disengage the flanged end and mating flange so that the body and hub can be disconnected. This is referred to herein as the "disassemble position."

In one embodiment, the adjustable connector has two components or sections, the body and the hub, which are provided with a flanged end and a mating flange, respectively, at their corresponding mating ends for connecting the two sections together. The faces of the flanged end and mating flange extend angularly with respect to the longitudinal axes of the body and hub, preferably, at between 30 and 60 degrees and, most preferably, about 45 degrees. The faces of the flanged end and the mating flange slidably and rotatably mate with each other when the body is connected to the hub. The mating flange on the hub is provided with a dovetail extending along a portion of its perimetrical edge that receives the edge of the flanged end of the body in a dovetail or tongue and groove relationship. Specifically, the outer surface of the edge of the flanged end slides into and is received by the dovetail on the complementary edge of the hub's mating flange. A clamp is installed over the hub's mating flange and contacts the body's flanged end, preferably, at a point opposite the dovetail. A coupling nut is then installed on the threaded end of the hub and tightened to secure the clamp in position.

The adjustable connector is particularly advantageous since it provides an unbiased axial alignment of the components. Consequently, there is no offset or bending when the cable passes through the two sections of the fitting until the sections are rotated to a desired orientation. This provides an initial straight-through connection that is advantageous, especially for cables having a large diameter, which are more difficult to bend and install in fittings. In addition, the adjustable connector can be easily disconnected, even after a cable is installed in the fitting, since the straight-through connection of the body and the hub facilitates disconnection and reorientation.

In a preferred embodiment, the outer surface of the dovetail can be provided with a handgrip to facilitate hand installation. The handgrip can be formed by one or more protrusions or ribs extending radially from the dovetail or it can be formed by one or more slots or depressions in the dovetail. The adjustable connector can be constructed from a metal or a plastic material, preferably by a molding process. In addition, the adjustable connector can include self draining capabilities through a drain hole in the hub that allows draining of the fitting when oriented at any angle.

The apertures in the body and hub can be provided with rounded interior surfaces to protect the cable from being cut or frayed by sharp edges. In addition, the fitting can be provided with a watertight O-ring for sealing the connection between the two mating flanges. The O-ring can be mounted in a substantially circular recess on the face of one of the mating flanges, preferably the hub.

For larger cables, the angular disposition of the mating flanges with respect to their longitudinal axes can be reduced to provide a more gradual bending of the cable. Preferably, each of the fittings for larger cables has a flanged end and a mating flange with faces disposed at 22.5 degrees to the longitudinal axis instead of 45 degrees to provide an increased bend radius. In this embodiment, two 45-degree adjustable connectors are used to provide a 90-degree connection. Each connector has a mating flange and flanged end with the faces disposed at 22.5 degrees from the longitudinal axis to form the 45-degree connector. Installing the two connectors in series provides a 90 degree connection.

In another embodiment, a coupler is installed between the body and the hub of the adjustable connector. One end of the coupler has a flanged end similar to the flanged end on the body and the other end of the coupler has a mating flange with a dovetail similar to the mating flange on the hub. The flanged end and mating flanges are joined in the same manner as the flanged end and mating flange on the body and hub. The flanged end of the coupler mates with the mating flange of the hub and the mating flange of the coupler mates with the flanged end of the body. The coupler can also have flanged ends that can be used to connect the coupler to hubs on each end. As will be appreciated by those skilled in the art, different combinations of flanged ends and mating flanges on the body, hub and coupler with their faces disposed at various angles from their axes can be used in order to provide a universal connection at any angle or a specifically shaped connection. When the coupling nuts engage the clamps and secured the flanged ends and mating flanges together, a three-member adjustable connector assembly (hub, coupling nut and body) locks all three axes of rotation XYZ of the adjustable connector and all three linear motions XYZ.

Figure 1:
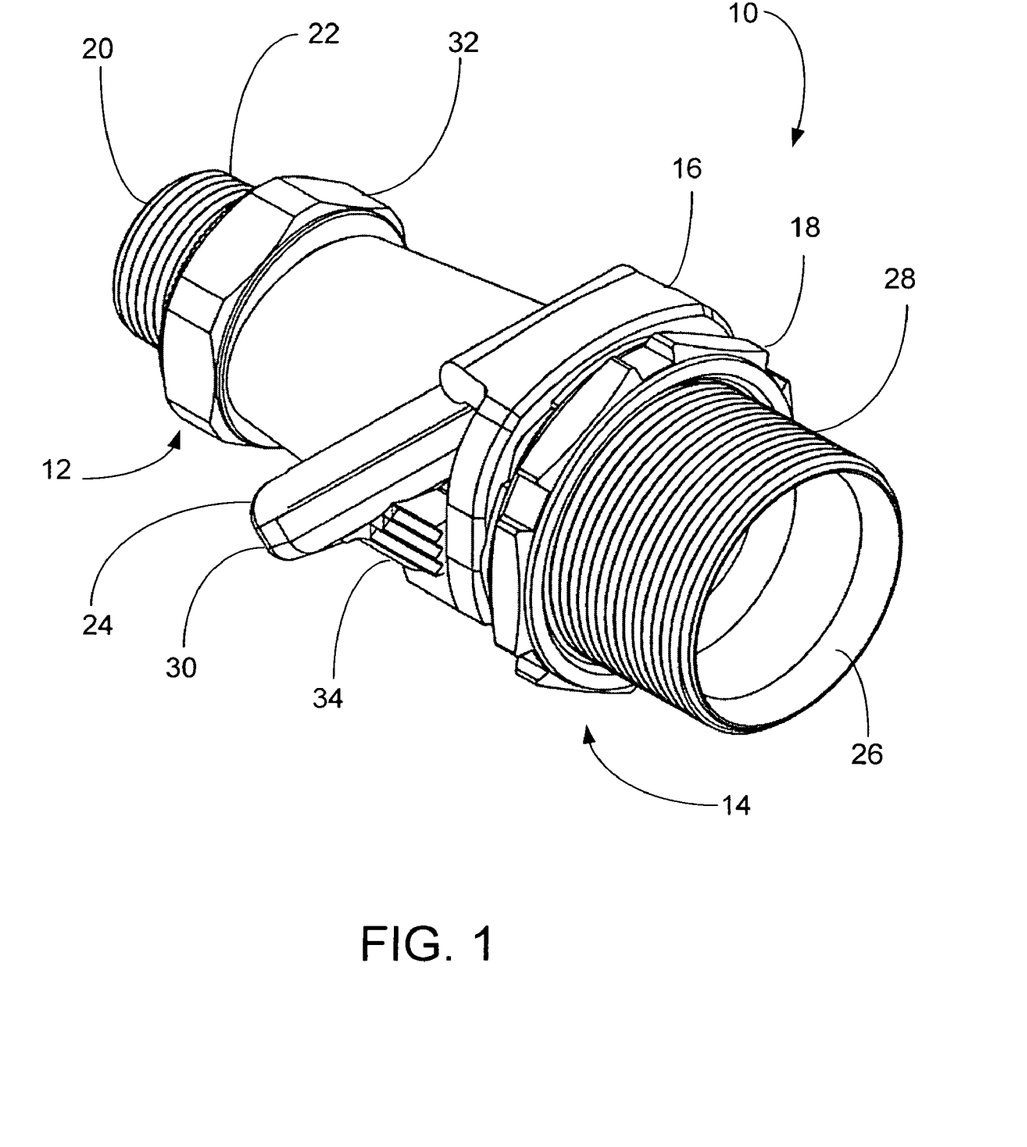
FIG. 1 is a perspective view of an embodiment of the adjustable connector of the present invention in the locked position.
Figure 2:
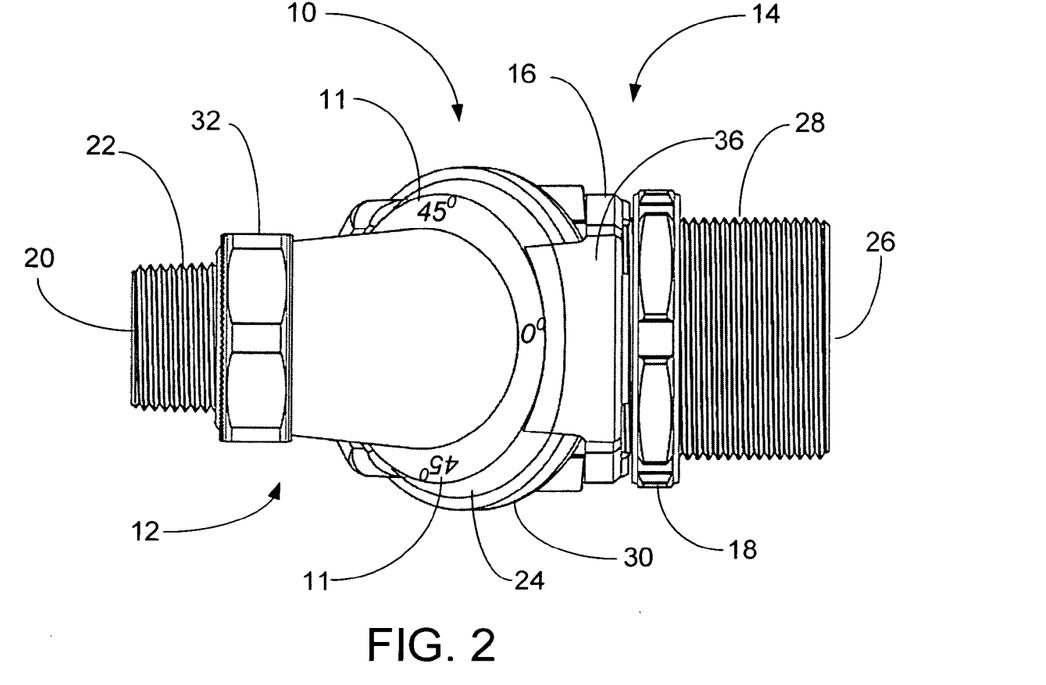
FIG. 2 is a top view of the embodiment of the adjustable connector shown in FIG. 1.
Figure 3:
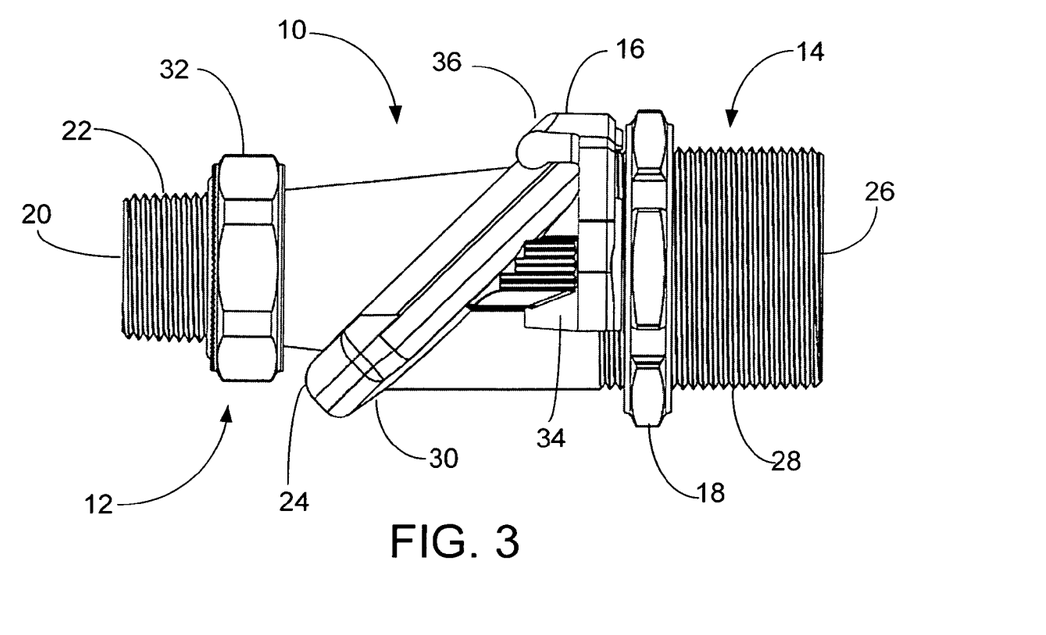
FIG. 3 is a side view of the embodiment of the adjustable connector shown in FIG. 1.

Referring to the drawings, FIGS. 1-3 show an embodiment of the adjustable connector 10 of the present invention, which includes a body 12 mated to a hub 14 and secured together by a clamp 16 and coupling nut 18. The body 12 has a connection end 20 with a threaded exterior surface 22 and a flanged end 24 that is angularly disposed to the longitudinal axis of the body 12. Similarly, the hub 14 is cylindrically shaped and has a connection end 26 with a threaded exterior surface 28 and a mating flange 30 that is angularly disposed to the central axis of the hub 14. After the flanged end 24 of the body 12 is mated to the mating flange 30 of the hub 14, the clamp 16 is installed onto the connection end 26 of the hub 14 and positioned over the flanged end 24 and mating flange 30. The hub 14 has a pair of wedged abutments 34 located on opposite sides at a point near the flanged end 30, which are engaged by the clamp 16 as described in more detail below. The clamp 16 is secured to the hub 14 by a coupling nut 18 that is threaded onto the connection end 26 of the hub 14. The connection end 20 of the body 12 also has a coupling 32, which is used to connect the connection end 20 to an armored cable (not shown).

FIG. 2 shows indicia 11 on the flanged end 24 of the body 12 that allow the user to determine the orientation of the connector 10. FIG. 2 also shows how the retainer 36 portion on the top of the clamp 16 extends over the flanged end 24 and mating flange 30 to secure them together. At the same time, the bottom of the clamp 16 on one side (FIG. 3) engages the wedged abutment 34 on the side of the hub 14. When the coupling nut 18 is tightened, the wedged abutments 34 move the clamp 16 towards the mating flange 30 and in a downward or radially inward direction to increase the force exerted by the retainer 36 on the flanged end 24 and mating flange 30. In order to rotate or disconnect the flanged end 24 and mating flange 30, the coupling nut 18 must be loosened so that the pressure applied to the flanged end 24 and mating flange 30 by the clamp 16 is decreased.

Figure 4:
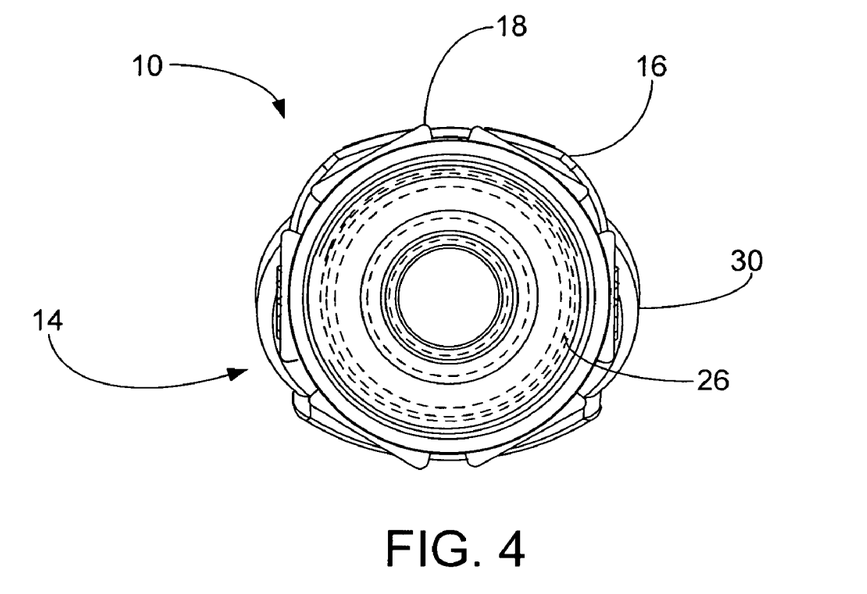
FIG. 4 is an end view of the embodiment of the adjustable connector shown in FIG. 1.

FIG. 4 shows an end view of the connector 10 viewed from the connection end 26 of the hub 14. The body 12 and hub 14 of the connector 10 are configured so that the axial bore 38 of the connector 10 forms a substantially straight passage and has a maximum inner diameter. The coupling nut 18 can be loosened so that the clamp 16 is released and the body 12 rotated with respect to the hub 14. This allows the connector 10 to form bends. Once the connector 10 is adjusted to a desired orientation, the coupling nut 18 can be tightened to secure the relative position of the body 12 and hub 14.

Figure 5:
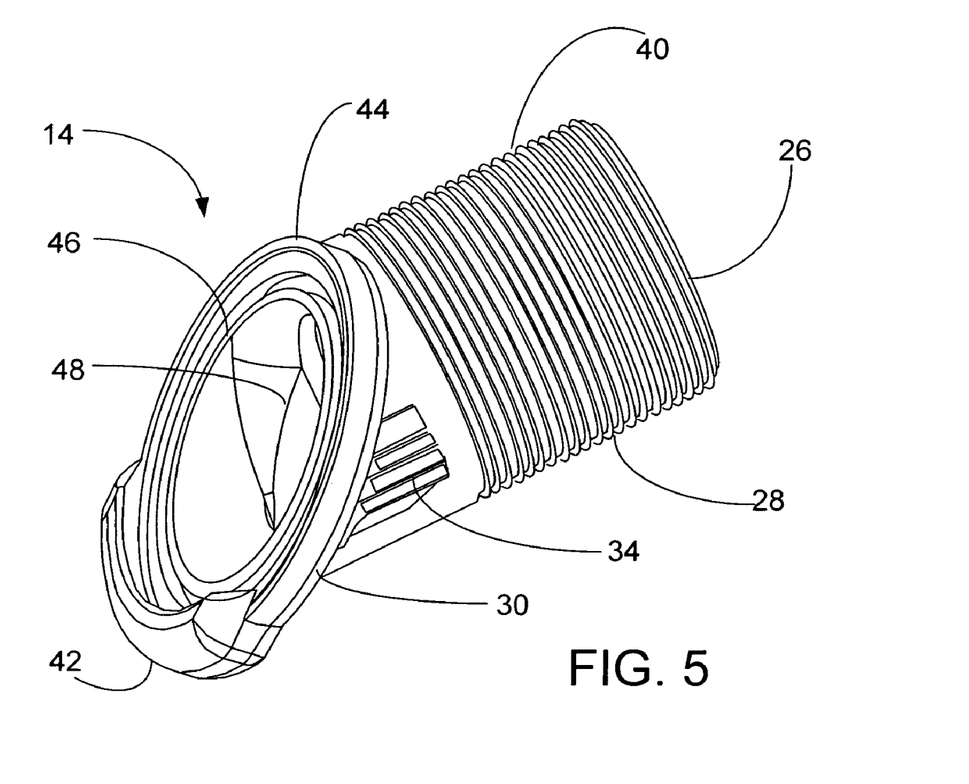
FIG. 5 is a top, perspective view of an embodiment of the hub of the adjustable connector of the present invention.

FIG. 5 shows the hub 14, which has a connection end 26 with a threaded exterior surface 28 for receiving both the coupling nut 18 (see FIG. 1) and a fitting for connecting an electrical cable (not shown). The hub 14 has a cylindrical portion 40 with a mating flange 30 opposite the connection end 26. The mating flange 30 has a dovetail 42 that extends around a portion of the outer perimeter of the mating flange 30 and receives the flanged end 24 of the body 12 (see FIG. 1). The mating flange 30 has a raised edge 44 on the outer perimeter and a mating surface 46 between the axial bore 48 of the cylindrical portion 40 and the raised edge 44. FIG. 5 shows how the mating flange 30 is angularly disposed to the central axis of the cylindrical portion 40 of the hub 14. The hub 14 has a pair of wedged abutments 34 (only one shown) on the exterior surface of the cylindrical portion 40 next to the mating flange 30. The wedged abutments 34 are located on opposite sides of the cylindrical portion 40.

Figure 6:
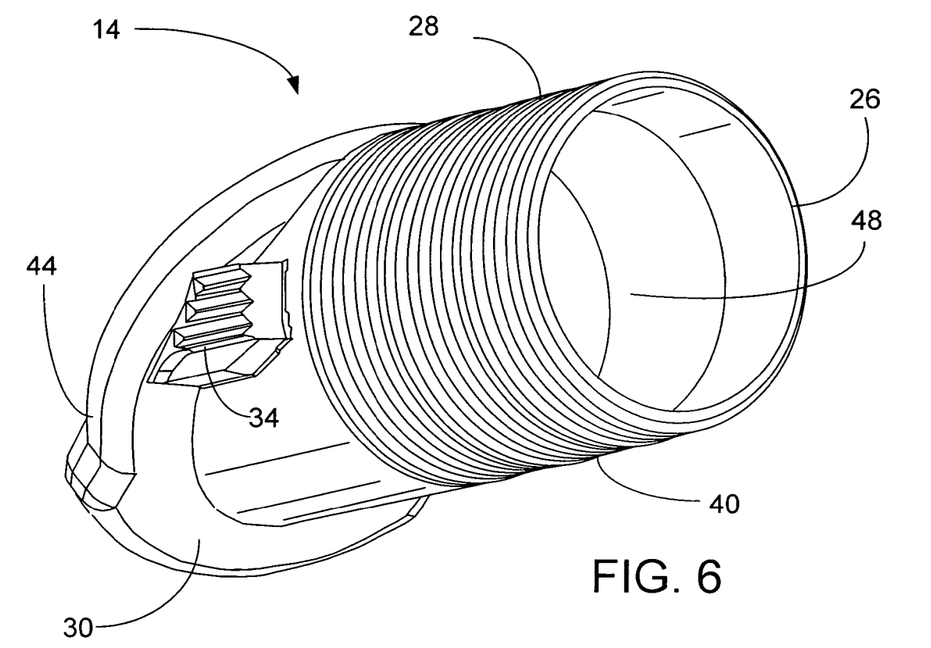
FIG. 6 is a bottom, perspective view of an embodiment of the hub of the adjustable connector of the present invention.

FIG. 6 shows the mating flange 30 of the hub 14 and the axial bore 48 from the connection end 26. In this embodiment of the connector 10, the wedged abutments 34 of the hub 14 have a stepped construction which allows the clamp 16 (see FIG. 1) to engage the wedged abutments 34 at different points.

Figure 7:
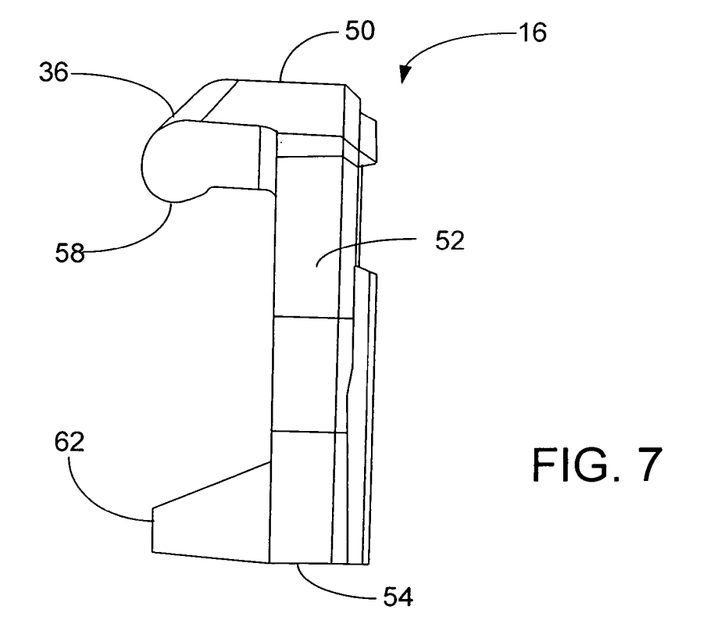
FIG. 7 is a side view of an embodiment of the clamp of the adjustable connector of the present invention.
Figure 8:
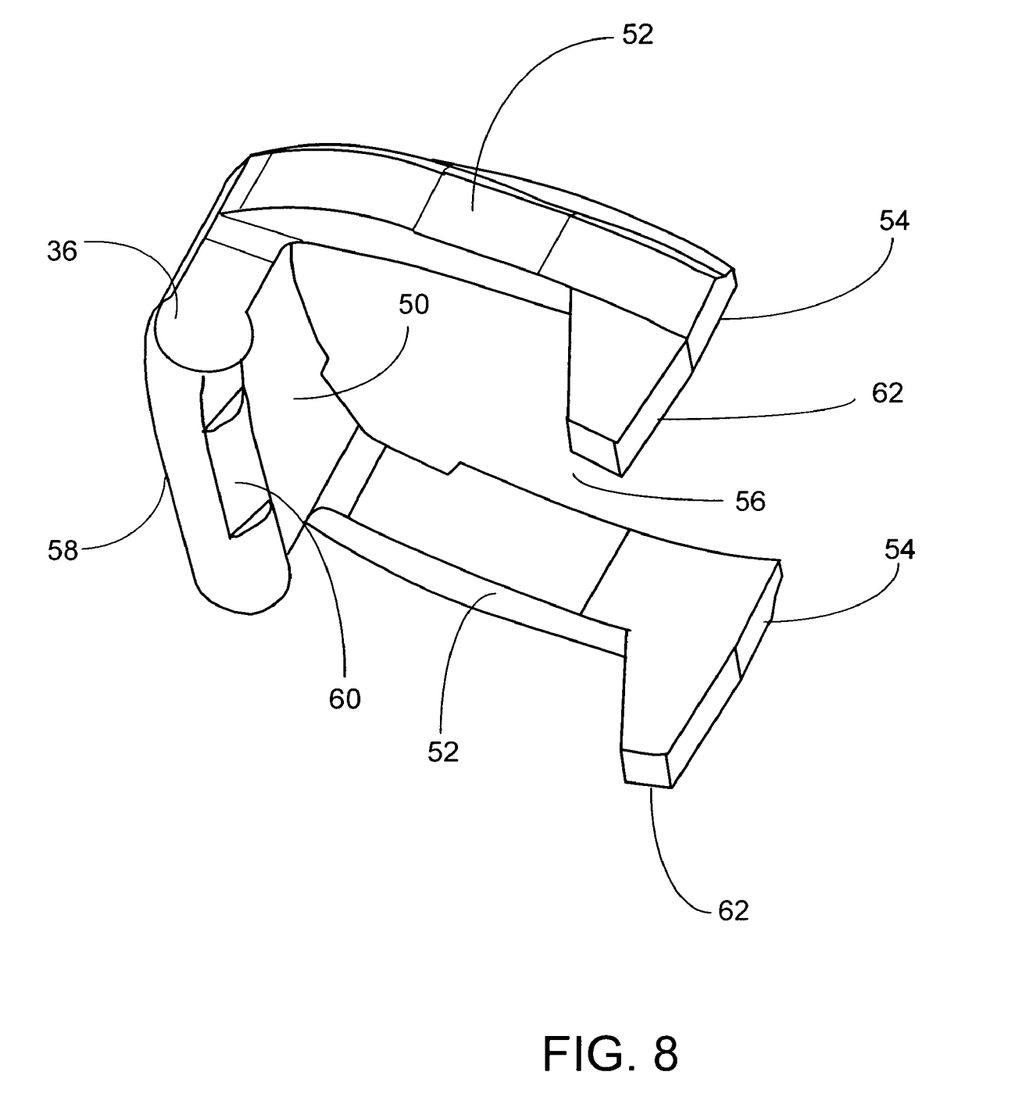
FIG. 8 is a perspective view the embodiment of the clamp shown in FIG. 7.

FIGS. 7 and 8 show the clamp 16 with a base wall 50 and a pair of curved side walls 52 extending from the opposing ends. The side walls 52 extend from the interior side of the opposing ends of the base wall 50 to distal ends 54 that define the interior 56 of the clamp 16. The retainer 36 extends outwardly from the top of the base wall 50 to a lip 58, which has a recessed portion 60 that is adapted to receive and engage the flanged end 24 of the body 12 (see FIG. 1). A tab 62 extends from the distal end 54 of each of the side walls 52. The tabs 62 are wedge-shaped and correspond to the wedged abutments 34 on the hub 14 (see FIG. 3).

Figure 9:
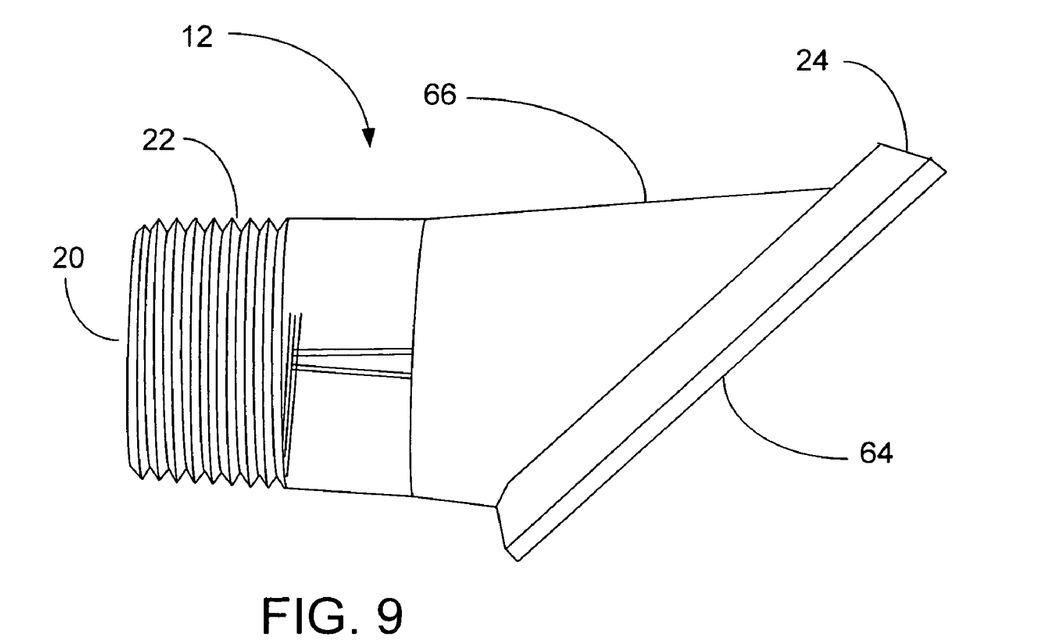
FIG. 9 is side view of an embodiment of the body of the adjustable connector of the present invention.

FIG. 9 shows the body 12 portion of the connector 10 with a connection end 20 that has a plurality of threads 22 for connecting to an electrical cable or enclosure (not shown) and a flanged end 24 with a substantially flat face 64 that extends around the opening in the body 12 and is angularly disposed to the longitudinal axis of the body 12. The body 12 has a substantially straight neck 66 that extends between the connection end 20 and the flanged end 24.

Figure 10:
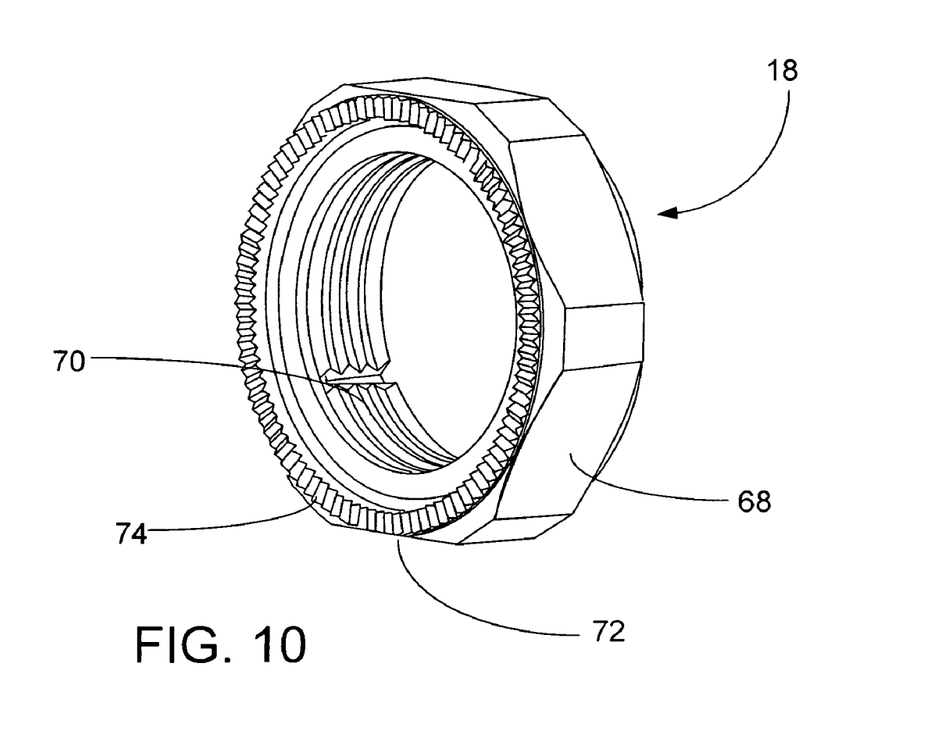
FIG. 10 is a perspective view of an embodiment of the coupling nut of the adjustable connector of the present invention.

FIG. 10 shows the coupling nut 18 with a plurality of flats 68 that can be engaged by a wrench or other tool for rotating the coupling nut 18 when it is installed on the hub 14 (see FIG. 1). The coupling nut 18 has a threaded interior surface 70 which threads onto the connection end 26 of the hub 14. Adjacent the perimetrical edge 72 on one end of the coupling nut 18, the surface has a plurality of notches 74 extending radially, which are adapted to engage the clamp 16 when the coupling nut 18 is threaded onto the hub 14. Thus, while not shown, clamp 16 is configured so as to have at least a partial surface that can engage and/or mate with notches 74.

Figure 11:
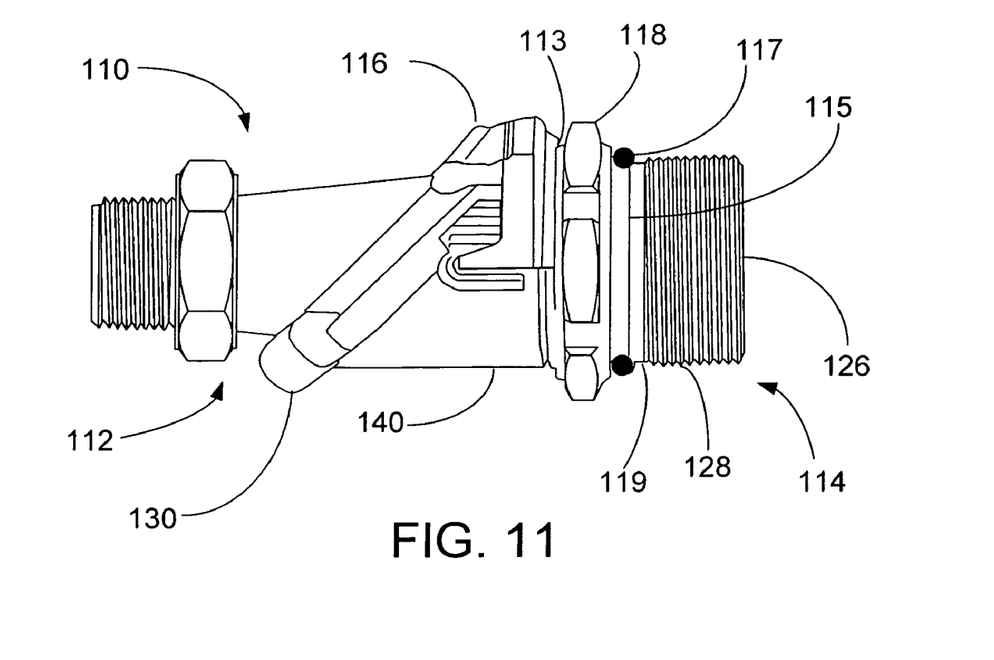
FIG. 11 is a side view of an embodiment of the connector of the present invention in the "tightened position."
Figure 12:
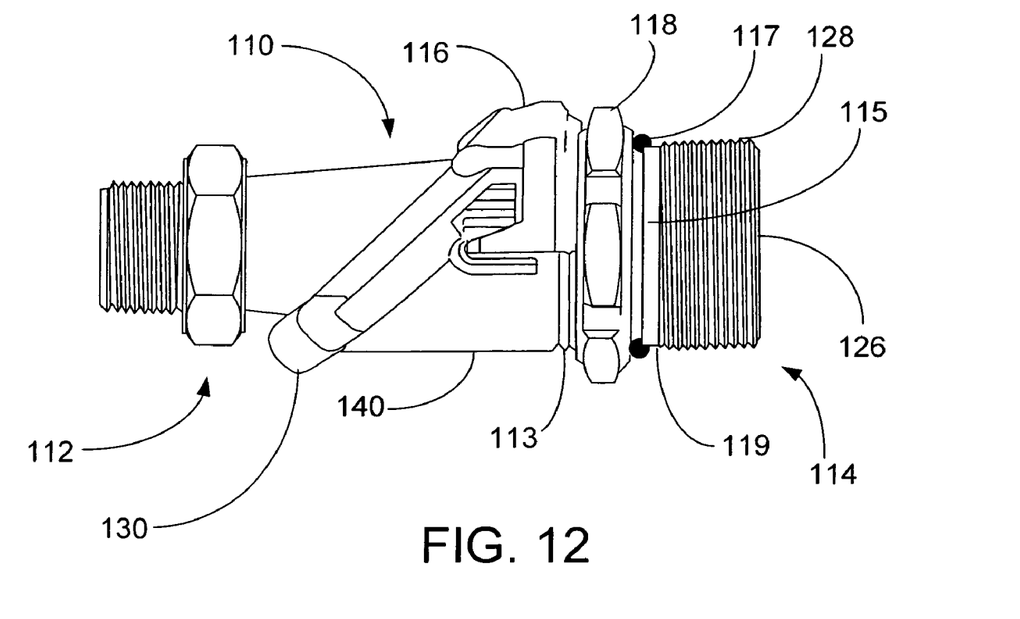
FIG. 12 is a side view of the embodiment of the connector shown in FIG. 11 in the "adjustable position."
Figure 13:
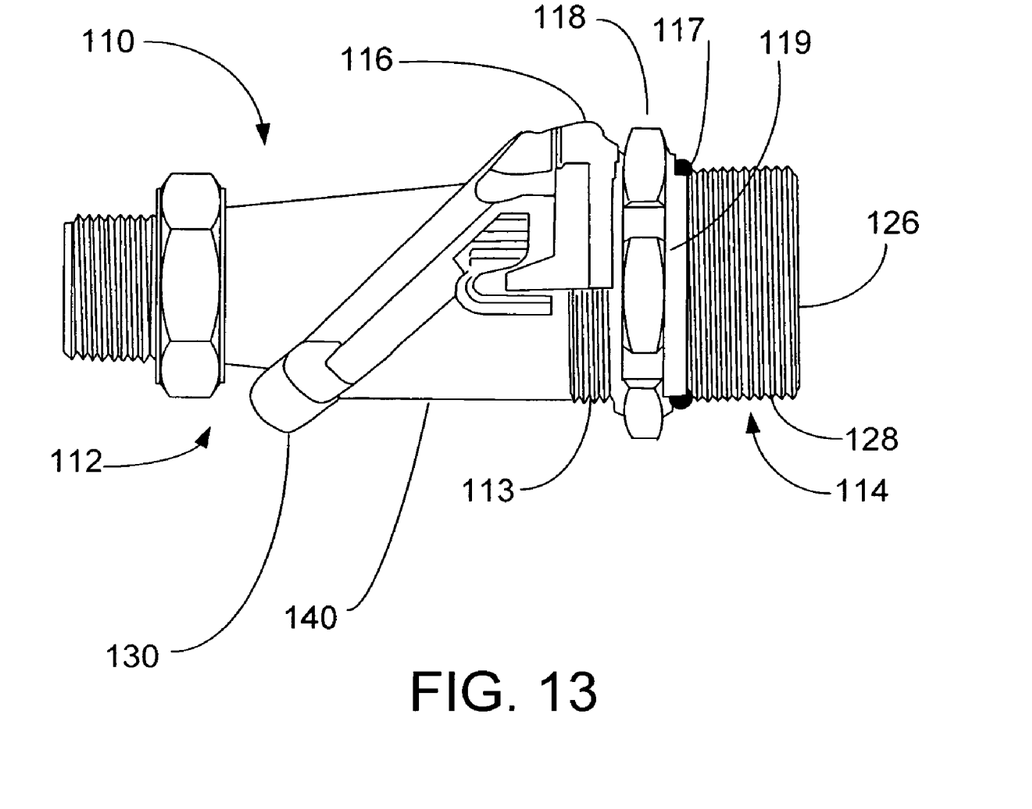
FIG. 13 is a side view of the embodiment of the connector shown in FIG. 11 in the "disassemble position."

FIGS. 11 to 13 show an embodiment of the connector 110 in which the hub 114 has two threaded sections on the cylindrical portion 140. One threaded section 128 is on the connection end 126 and is used for connecting the hub 114 to electrical cables (not shown). The other threaded section 113 (FIG. 13) is near the middle of the cylindrical portion 140 and is separated from the threaded section 128 of the connection end 126 by a circumferential groove 115 and/or an unthreaded section 119. An O-ring 117 is removably installed in the circumferential groove 115 and acts as a stop to limit the travel of the coupling nut 118. FIG. 11 shows the coupling nut 118 in a "tightened position" in which it applies a force on the clamp 116 which prevents the body 112 and hub 114 from moving with respect to each other. In the tightened position, the O-ring 117 does not contact the coupling nut 118.

FIG. 12 shows the coupling nut 118 in an "adjustable position" wherein the coupling nut 118 is exerting minimum pressure on the clamp 116 and the circumferential groove 115 is located adjacent to the coupling nut 118. In this position, the clamp 116 prevents the body 112 and hub 114 from separating but allows them to freely rotate so that the user can adjust the orientation. The coupling nut 118 is loosened so that the threaded section 113 on the mating flange 130 side of the groove 115 is partially visible. The O-ring 117 prevents the coupling nut 118 from moving past the groove 115. In this position, the body 112 and hub 114 can freely rotate but will not separate so that the connector 110 can be disassembled.

FIG. 13 shows the coupling nut 118 in the "disassemble position" wherein the coupling nut 118 is no longer exerting pressure on the clamp 116 to prevent the body 112 from being separated from the hub 114. The O-ring 117 is removed from the circumferential groove 115 and moved onto the adjacent non-threaded surface 119 of the hub 114. The coupling nut 118 is loosened so that the threaded section 113 on the mating flange 130 side of the groove 115 is visible. In this position, the O-ring 117 does not interfere with the movement of the coupling nut 118 to a position that allows the body 112 and hub 114 to be separated.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

I claim:

1. An adjustable connector for electrical cables, the adjustable connector comprising:
    a body having a longitudinal axis, a flanged end, a cable connecting end and an aperture extending therebetween, wherein the flanged end has a face that is angularly disposed to the longitudinal axis;
    a hub comprising a cylindrical portion and a mating flange, wherein the cylindrical portion has a central axis, an exterior surface, first and second ends and an opening extending therebetween, wherein the mating flange is connected to the first end and extends radially from the opening to an outer perimeter that is angularly disposed to the central axis, wherein the mating flange has a dovetail extending in an arc of at least 45 degrees around the outer perimeter, and wherein the exterior surface adjacent the second end has a plurality of threads;
    a clamp; and
    a coupling nut,
    wherein the dovetail is adapted to receive the flanged end and the clamp is adapted to secure the flanged end to the mating flange, and wherein the coupling nut is installed on the threaded second end to secure the clamp in place.

2. The adjustable connector according to claim 1, wherein the flanged end of the body is angularly disposed to the longitudinal axis at an angle of about 45 degrees and the mating flange of the hub is angularly disposed to the central axis at an angle of about 45 degrees.

3. The adjustable connector according to claim 2, wherein the body is connected to the hub and the longitudinal axis is substantially parallel to the central axis or the longitudinal axis is disposed with respect to the central axis at an angle of from about 0 to about 90 degrees.

4. The adjustable connector according to claim 1, wherein the flanged end of the body is angularly disposed to the longitudinal axis at an angle of from about 30 to about 60 degrees and the mating flange of the hub is angularly disposed to the central axis at an angle of from about 30 to about 60 degrees.

5. The adjustable connector according to claim 1, wherein the cylindrical portion of the hub comprises a circumferential groove between the first and second ends, and wherein the groove is adapted to receive an elastic O-ring.

6. The adjustable connector according to claim 1, wherein the hub further comprises a pair of wedged abutments on the exterior surface of the cylindrical portion adjacent to the mating flange, and wherein the wedged abutments are located at opposing points on the cylindrical portion and are adapted to engage the clamp.

7. The adjustable connector according to claim 1, wherein the clamp comprises:
  a base wall having a top, an interior side and opposing ends;
  a pair of side walls extending from the interior side of the opposing ends to a pair of distal ends and having a top corresponding to the top of the base wall;
  a retainer connected to the top of the base wall; and
  a pair of tabs extending from the tops of the distal ends of the side walls,
    wherein the base wall and the pair of side walls define an interior.

8. The adjustable connector according to claim 7, wherein the base and the pair of side walls are arcuately shaped and correspond to the cylindrical portion of the hub.

9. The adjustable connector according to claim 8, wherein the hub further comprises a pair of wedged abutments adjacent to the first end on the exterior surface, and wherein the pair of wedged abutments are adapted to engage the pair of tabs of the clamp.

10. The adjustable connector according to claim 9, wherein the retainer extends upwardly from the top of the base wall to a lip, wherein the lip extends towards the interior of the clamp.

11. The adjustable connector according to claim 10, wherein the lip has a recessed portion that is adapted to receive the flanged end of the body.

12. The adjustable connector according to claim 1, wherein the flanged end has indicia of the angular disposition of the adjustable connector.

13. The adjustable connector according to claim 1, wherein the cable connecting end of the body is threaded and wherein the threaded second end of the hub is adapted to receive a cable.

14. The adjustable connector according to claim 1, wherein the coupling nut has first and second ends with an axial bore extending therebetween, a perimetrical edge extending around the perimeter of the axial bore at the first end and a plurality of notches located on the first end adjacent to the perimetrical edge, and wherein the plurality of notches engage the clamp when the coupling nut is threaded onto the second end of the hub.

15. The adjustable connector according to claim 1, wherein the mating flange has a raised edge on the outer perimeter and a mating surface between the opening in the cylindrical portion and the raised edge.

16. An adjustable connector for electrical cables, the adjustable connector comprising:
  a body having a longitudinal axis, a flanged end, a cable connecting end and an aperture extending therebetween, wherein the flanged end has a face that is angularly disposed to the longitudinal axis;
  a hub comprising a cylindrical portion and a mating flange, wherein the cylindrical portion has a central axis, an exterior surface, a pair of wedged abutments on the exterior surface, first and second ends and an opening extending therebetween, wherein the mating flange is connected to the first end and extends radially from the opening to an outer perimeter that is angularly disposed to the central axis, wherein the mating flange has a dovetail extending in an arc of at least 45 degrees around the outer perimeter, wherein the exterior surface adjacent the second end has a plurality of threads and wherein the pair of wedged abutments are adjacent to the mating flange on opposing sides of the cylindrical portion, and wherein the wedged abutments are adapted to engage the clamp;
  a clamp comprising
    a base wall having a top, an interior side and opposing ends;
    a pair of side walls extending from the interior side of the opposing ends to a pair of distal ends and having a top corresponding to the top of the base wall;
    a retainer connected to the top of the base wall; and
    a pair of tabs extending from the tops of the distal ends of the side walls,
      wherein the base wall and the pair of side walls define an interior and wherein the tabs engage the wedged abutments; and
  a coupling nut,
  wherein the dovetail is adapted to receive the flanged end and the clamp is adapted to secure the flanged end to the mating flange, and wherein the coupling nut is installed on the threaded second end to secure the clamp in place.

17. The adjustable connector according to claim 16, wherein the flanged end of the body is angularly disposed to the longitudinal axis at an angle of from about 30 to about 60 degrees and the first end of the hub is angularly disposed to the central axis at an angle of from about 30 to bout 60 degrees.

18. The adjustable connector according to claim 16, wherein the retainer extends upwardly from the top of the base wall to a lip, wherein the lip extends towards the interior of the clamp, and wherein the lip has a recessed portion that is adapted to receive the flanged end of the body.

19. The adjustable connector according to claim 16, wherein the cylindrical portion of the hub comprises a circumferential groove between the first and second ends, and wherein the groove is adapted to receive an elastic O-ring.

20. The adjustable connector according to claim 16, wherein the mating flange has a raised edge on the outer perimeter and a mating surface between the opening in the cylindrical portion and the raised edge.

21. An adjustable connector for electrical cables, the adjustable connector comprising:
  a body having a longitudinal axis, a flanged end, a cable connecting end and an aperture extending therebetween, wherein the flanged end has a face that is angularly disposed to the longitudinal axis;
  a hub comprising a cylindrical portion and a mating flange, wherein the cylindrical portion has a central axis, an exterior surface, a pair of wedged abutments on the exterior surface, first and second ends and an opening extending therebetween, wherein the mating flange is connected to the first end and extends radially from the opening to an outer perimeter that is angularly disposed to the central axis, wherein the mating flange has a raised edge on the outer perimeter and a mating surface between the opening in the cylindrical portion and the raised edge and a dovetail extending in an arc of at least 45 degrees around the outer perimeter, wherein the exterior surface adjacent the second end has a plurality of threads and wherein the pair of wedged abutments are adjacent to the mating flange on opposing sides of the cylindrical portion, and wherein the wedged abutments are adapted to engage the clamp;

a clamp comprising
- a base wall having a top, an interior side and opposing ends;
- a pair of side walls extending from the interior side of the opposing ends to a pair of distal ends and having a top corresponding to the top of the base wall;
- a retainer connected to the top of the base wall; and
- a pair of tabs extending from the tops of the distal ends of the side walls,
  - wherein the base wall and the pair of side walls define an interior, wherein the base and the pair of side walls are arcuately shaped and correspond to the cylindrical portion of the hub, and wherein the tabs engage the wedged abutments; and a coupling nut, wherein the dovetail is adapted to receive the flanged end and the clamp is adapted to secure the flanged end to the mating flange, and wherein the coupling nut is installed on the threaded second end to secure the clamp in place.

22. The adjustable connector according to claim 21, wherein the flanged end of the body is angularly disposed to the longitudinal axis at an angle of from about 30 to 60 degrees and the first end of the hub is angularly disposed to the central axis at an angle of from about 30 to 60 degrees.

23. The adjustable connector according to claim 21, wherein the retainer extends upwardly from the top of the base wall to a lip, wherein the lip extends towards the interior of the clamp, and wherein the lip has a recessed portion that is adapted to receive the flanged end of the body.

24. The adjustable connector according to claim 21, wherein the cylindrical portion of the hub comprises a circumferential groove between the first and second ends, and wherein the groove is adapted to receive an elastic O-ring.

* * * * *